United States Patent
Chen et al.

(10) Patent No.: US 9,567,440 B2
(45) Date of Patent: Feb. 14, 2017

(54) FIBER GRADE POLYPHENYLENE SULFIDE RESIN SYNTHESIS METHOD

(71) Applicants: ZHEJIANG NHU SPECIAL MATERIALS CO., LTD., Shangyu, Zhejiang Province (CN); ZHEJIANG UNIVERSITY, Hangzhou, Zhejiang Province (CN); SHANGYU NHU BIOLOGICAL CHEMICAL CO., LTD., Shangyu, Zhejiang Province (CN); ZHEJIANG NHU COMPANY LTD., Shaoxing, Zhejiang Province (CN)

(72) Inventors: Zhirong Chen, Hangzhou (CN); Woyuan Li, Shangyu (CN); Haoran Li, Hangzhou (CN); Ming Lian, Shangyu (CN); Hong Yin, Hangzhou (CN); Guiyang Zhou, Shangyu (CN); Xinfeng Zheng, Shangyu (CN)

(73) Assignees: ZHEJIANG NHU SPECIAL MATERIALS CO., LTD., Shangyu (CN); ZHEJIANG UNIVERSITY, Hangzhou (CN); SHANGYU NHU BIOLOGICAL CHEMICAL CO., LTD., Shangyu (CN); ZHEJIANG NHU COMPANY LTD., Shaoxing (CN)

( * ) Notice: Subject to any disclaimer, the term of this patent is extended or adjusted under 35 U.S.C. 154(b) by 0 days.

(21) Appl. No.: 14/655,326

(22) PCT Filed: Oct. 29, 2013

(86) PCT No.: PCT/CN2013/086096
§ 371 (c)(1),
(2) Date: Jun. 24, 2015

(87) PCT Pub. No.: WO2014/101564
PCT Pub. Date: Jul. 3, 2014

(65) Prior Publication Data
US 2015/0344632 A1     Dec. 3, 2015

(30) Foreign Application Priority Data

Dec. 26, 2012 (CN) .......................... 2012 1 0576780

(51) Int. Cl.
C08G 75/16     (2006.01)
C08G 75/00     (2006.01)
C08G 75/02     (2016.01)

(52) U.S. Cl.
CPC ............... *C08G 75/16* (2013.01); *C08G 75/02* (2013.01)

(58) Field of Classification Search
CPC ....................................................... C08G 75/16
USPC ................................................. 528/381, 387
See application file for complete search history.

(56) References Cited

U.S. PATENT DOCUMENTS

2012/0178898 A1*   7/2012   Unohara et al.

FOREIGN PATENT DOCUMENTS

| CN | 1377375 A    | 10/2002 |
|----|--------------|---------|
| CN | 102482420 A  | 5/2012  |
| JP | 2009057414 A | 3/2009  |
| WO | WO0039196 A1 | 7/2000  |

* cited by examiner

*Primary Examiner* — Duc Truong
(74) *Attorney, Agent, or Firm* — Jiwen Chen

(57) ABSTRACT

The present invention discloses a fiber-grade polyphenylene sulfide resin synthesis method, taking sodium bisulfide and p-dichlorobenzene as raw materials, N-methyl pyrrolidone as the solvent and C5-C6 fatty acid salt formed through dehydration to C5-C6 fatty acid and sodium hydroxide as the polymerization additive for synthesis through polymerization. White polyphenylene sulfide resin is obtained through acidification and washing of reaction slurry. In view of the fact that MFR is below 125 g/10 min, weight-average molecular weight as measured by GPC is over $4.2 \times 10^4$, and whiteness is over 90, it can satisfy requirements for fiber polyphenylene sulfide resin. C5-C6 fatty acid salt according to the method of the present invention has a higher solubility in NMP, which can better promote polymerization. It is to be fully diverted into the filtrate after filter prior to conversion into free fatty acid again through acidification with hydrochloric acid. C5-C6 fatty acid is available for azeotropy with water, which has a limited solubility in water. Therefore, it is applicable to recycle C5-C6 fatty acid from the filtrate through azeotropy with water, and thereby solve the problem with separation of additive and sodium chloride that are soluble in water.

7 Claims, No Drawings

FIBER GRADE POLYPHENYLENE SULFIDE RESIN SYNTHESIS METHOD

This is a U.S. national stage application of PCT Application No. PCT/CN2013/086096 under 35 U.S.C. 371, filed Oct. 29, 2013 in Chinese, claiming the priority benefit of Chinese Application No. 201210576780.5, filed Dec. 26, 2012, which is hereby incorporated by reference.

FIELD OF THE TECHNOLOGY

The present invention is related to a polyphenylene sulfide resin synthesis method, in particular to a method for synthesis of fiber-grade polyphenylene sulfide resin with polymerization additives of special structure.

BACKGROUND ART

Polyphenylene sulfide (PPS) is also known as thiophenylene, which has a symmetrical macromolecular linear rigid structure formed by association between phenyl ring and sulfur atom; its molecular structure is shown as follows:

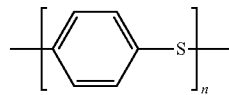

Polyphenylene sulfide is an excellent special engineering plastic, which serves as the sixth universal engineering plastics following polycarbonate (PC), polyester (PET), polyformaldehyde (POM), polyamide (PA) and polyphenylene oxide (PPO) as well as one of the eight aerospace materials. Owing to its chemical structure featuring in alternating and ordered arrangement of sulfur atoms and phenyl rings, polyphenylene sulfide can ensure highly stable chemical bond of molecules, which has such features as high temperature and radiation resistance, flame retardancy, low viscosity, high dimensional stability, high resistance to solvents and chemical corrosion, excellent dielectrical properties and wear resistance. Its major physiochemical properties are stated as follows:

(1) High temperature resistance: PPS has excellent thermal performance with melting point and thermal deformation temperature over 280° C. and 260° C. respectively; it can withstand an instantaneous temperature of 260° C. and is available for long-term application below the temperature of 200° C. As its thermal deformation temperature is up to 350° C., it is presently one of the thermoplastic engineering plastics with maximum working temperature.

(2) Chemical resistance: High chemical resistance is one of the most distinctive features of PPS; its chemical stability is just next to polytetrafluoroethene (PTEE). PPS is stable to most acids, esters, ketones, aldehydes, phenols as well as fatty, aromatic, chlorinated hydrocarbons, etc. So far, no solvent that can dissolve polyphenylene sulfide below the temperature of 200° C. has been discovered yet. PPS has a high resistance to inorganic acid, alkali and salts. It is only soluble in diphenyl and diphenyl ethers as well as their halides above the temperature of 250° C.

(3) Excellent electrical properties: PPS has excellent electrical properties; its dielectric constant and tangent value of dielectric loss angle are relatively low as compared with other engineering plastics, which can remain almost unchanged in case of excessive frequency, temperature and temperature ranges. PPS also has high resistance to electric arc, which is on par with thermosetting plastics. PPS is frequently used as insulating material for electrical appliances, of which consumption accounts for approximately 30% of the total consumption amount of the PPS.

(4) Flame retardancy and wear resistance: PPS has an oxygen index of 46-53, which is available for combustion on the flame other than dripping. It is to be extinguished automatically once moved away from the flame, of which smoke production is lower than that of halogenated polymers. It is up to the high flame retardancy criteria of UL-94V-O without addition of any fire retardant. It is applicable to fill in fluororesin and carbon fiber lubricant to significantly improve wear resistance and properties of PPS.

(5) Perfect machining performance: It is applicable to produce PPS by means of injection, mold pressing and extrusion to ensure relatively low forming shrinkage, linear expansion coefficient and water absorption. Its products are free of any deformation in the environment of high temperature and humidity.

Owing to its excellent properties and perfect compatibility to inorganic fillers, reinforced fibers and other polymer materials, polyphenylene sulfide can be fabricated into various reinforced fillers and polymer alloys. It has extensive applications, which is mainly used in such industries as electronic and electrical appliances, precise instruments, machineries, vehicles, household appliances, films, fibers, power supply, aviation, environmental protection and chemistry.

As reported by literatures, there are numerous methods for synthesis of PPS. However, there is only one real industrialized method for synthesis of PPS through polycondensation between sulfides and polyhalogenated aromatic hydrocarbons. Sulfides are mainly represented by sodium sulfide and sodium bisulfide or hydrogen sulfide as reported by literatures. Working principle of hydrogen sulfide is almost identical to that of sodium sulfide. The only difference lies in the supplemented reaction for generation of sodium sulfide by using sodium hydroxide to absorb sodium bisulfide gas. Presently, most of PPS manufacturers and research institutions are concentrated in USA, Japan and China.

Phillips Petroleum Company developed a method for industrialized synthesis of PPS in 1960s and 1970s. The company proposed for the first time to use sodium sulfide and dichlorobenzene as materials and N-methyl-2-pyrrolidone as the solvent for production of PPS resin with melting point over 275° C. through dehydration and polycondensation in the U.S. Pat. No. 3,354,129, and realized industrialized production of PPS for the first time in 1971. Its products were later put into the market under the commodity name of "Ryton". Owing to low price and easy acquisition of materials, limited technical route, stable production quality and high yield, the method for synthesis of PPS by using sodium sulfide as material has attracted high attentions. For similar synthesis methods, one can refer to U.S. Pat. No. 3,487,454, U.S. Pat. No. 5,393,865, U.S. Pat. No. 3,867,356, U.S. Pat. No. 4,038,260, U.S. Pat. No. 4,024,118 and U.S. Pat. No. 4,038,263. At the early stage, impact resistance of products produced with such method was relatively poor due to relatively lower molecular weight (weight-average molecular weight is below $2.0 \times 10^4$). Moreover, humidity resistance, electrical properties and shaping properties are relatively poor due to existence of inorganic salt. To lower fluidity of resin, and satisfy processing requirements, two methods were used to increase molecular weight of resin during early industrialized production of PPS. One method was expected to obtain PPS resin of low cross-linking level by reducing molecular weight for thermal oxidized cross linking; whereas the other method aimed to obtain branch chained PPS resin by adding limited amount of third reaction monomer (normally polyhalogenated aromatic hydrocarbons above trifunctional level). Nevertheless, the resin as obtained through thermal oxidized cross linking was unavailable for spinning; whereas spinning performance of PPS resin as obtained through addition of polyhalogenated aromatic hydrocarbons above trifunctional level was also unsatisfactory.

Phillips Petroleum Company was the only company engaged in production of PPS resin before 1985 due to patent protection. However, other companies began to establish production facilities to produce PPS resin after 1985, and thereby gradually secured their leading positions in production of PPS resin.

TORAY from Japan has performed massive studies on materials and techniques used by sodium sulfide method, and applied numerous Japanese patents (such as TK 2001-261832, TK 2002-265604, TK 2004-99684, TK 2005-54169, TK 2006-182993, TK 2007-9128, TK 2009-57414, TK 2010-53335 and so on), US patent (U.S. Pat. No. 4,286,018), international patent (WO2006-059509) and Chinese patent (CN200480015430.5). Such patents have provided detailed studies on varieties and consumption of polyhalogenated aromatic compounds, sulfides, solvents and polymerization reaction additives. Among them, polyhalogenated aromatic compounds are mainly represented by 1,4-dichlorobenzene and 1,2,4-trichloro-benzene; sulfides are mainly represented by aquo sodium sulfide. N-methyl-2-pyrrolidone (NMP) is used as the solvent; whereas sodium acetate is used as the polymerization reaction additive. Patents as applied by that company have also provided detailed description of technique control; reaction process normally aims at mixed dehydration of organic solvents, sulfides, polyhalogenated aromatic compounds and polymerization reaction additives within the temperature range of 100~230° C. for the purpose of producing PPS resin through polymerization within the temperature range of 200~290° C. In order to obtain PPS of higher degree of polymerization, it is essential to proceed with polymerization by numerous stages for extrusion and shaping of PPS resin obtained. However, patents as applied by the company are not involved with isolation or recycling of sodium acetate, the polymerization additive.

KUREHA TECHNO ENG CO., LTD from Japan has also applied numerous Japanese patents for synthesis techniques on PPS resins of different properties (such as TKZ 62-187731, TKZ 62-253626, TKZ 62-285922, TKZ 63-39926, TKP 6-145355, TKP 8-183858, TK 2000-191785, TK 2004-244619 and TK 2004-51732). Its selection of polyhalogenated aromatic compounds, sulfides, solvents and polymerization additives is similar to that of TORAY. Polymerization aims to obtain acceptable PPS resin through two-stage reaction. According to requirements, polymerization additives are to be added at different polymerization stages. Furthermore, mole ratio of $H_2O/S$ is normally over 1.0 at polymerization stage. It is also essential to supplement water at the later stage of polymerization to increase mole ratio of $H_2O/S$ to 2.5~3.0. This may significantly increase the reaction pressure, which has put forward higher requirements for reaction devices. Chinese Patent CN88108247.3 as applied by the company in China has also mentioned similar PPS resin synthesis techniques. To improve performance of final products, patents as applied by the company have provided numerous reports on after-treatments such as pickling.

Polymerization techniques as described in Japanese patents applied by Tonen Chemical Corporation (such as TKP 5-222196, TKP 6-157756, TKP 7-102065, TKP 7-224165 and TKP 7-292107) are also in two-stage reaction mode. To obtain PPS resin of higher molecular weight, cooling reflux device is added to the gas phase of the reactor in addition to supplement of polymerization additives and trichloro-benzene. This aims to minimize degradation by-reaction.

Japanese patents (such as TKP 5-78487 and TKP 5-78488) applied by Tosoh Finechem Corporation propose to add multifunctional monomers during polymerization for co-condensation to obtain PPS of higher molecular weight. Japanese patents (such as TKP 3-43692 and TKP 5-140328) as applied by the company also propose to proceed with oxidized cross linking of synthetic PPS resin to reduce melt mass-flow rate (MFR), and improve mechanical performance of PPS resin.

US patents (U.S. Pat. No. 4,490,522, U.S. Pat. No. 4,507,468 and U.S. Pat. No. 5,169,892) applied by Dainippon Ink Chemicals Inc has also provided a description of method for synthesis of PPS resin through single-stage or multi-stage polymerization. As proposed in US patents (U.S. Pat. No. 6,369,191 and U.S. Pat. No. 6,600,009), a coolant is supplied to the cooling device at the top or inside of the reactor at the later stage of heat preservation during polymerization to reduce the pressure inside the reactor. Once the polymerization is completed, proceed with cooling to the specified temperature before adding acetic acid, oxalate, formic acid, chloroacetic acid, hydrochloric acid and sodium bisulfate for acid treatment of slurry. PPS resin as obtained in this way may have a crystallization temperature over 220° C., a whiteness of 50-65 and a maximum viscosity of 240 Poise.

Japan is a leading PPS resin producing country at present. Most of companies in Japan focus on systematic studies of polymerization process and post treatment techniques other than recycling of solvents and additives.

Studies on synthesis and application of PPS resin in China were started in 1970s. Relevant research and manufacturing enterprises have also applied some Chinese patents (CN85102554A, CN85109096A, CN00116141.5, CN00120629.X, CN02113673.4, CN200510022437.6 and so on). Presently, major PPS resin manufacturers in China include Sichuan Deyang Chemical Co., Ltd., Zigong Honghe Chemical Co., Ltd. and so on. Sodium sulfide and p-dichlorobenzene are frequently used as materials for PPS synthesis in China; whereas synthesis techniques are also similar to sodium sulfide based techniques abroad. To improve product performance, a large quantity of additives is added during dehydration, synthesis and post treatment.

Meng Xiao et al. (Modern Chemistry, 32(2), 36-40) propose to proceed with solid-liquid separation of water contained slurry upon completion of polymerization by using lithium chloride as the reaction additive; water contained in the filtrate obtained is to be removed through depressurization and distillation prior to heat preservation, sedimentation and removal of inorganic salt through filter; whereas residual filtrate is to be directly used for follow-up PPS synthesis. Despite of the fact that such method for treatment of filtrate is relatively simple, it is still necessary to increase the proportion of solvent during polymerization in view of limited solubility of lithium chloride in NMP.

Water containing sodium sulfide is normally in solid form, which may produce numerous impurities through oxidization during transport. This is unfavorable for synthesis of PPS resin of high molecular weight. On the contrary, sodium bisulfide is in the form of aqueous solution at a higher concentration, which is unlikely to be oxidized during transport. Therefore, it is more favorable for accurate measurement. For this purpose, various PPS manufacturers have carried out studies on polymerization techniques using sodium bisulfide as the material.

According to the patent (TK 2010-70702) applied by TORAY, sodium bisulfide is mixed with p-dichlorobenzene, sodium hydrate and NMP for direct heating to produce PPS of low molecular weight through polymerization, and thereby obtain oligomer with weight-average molecular weight of approximate $1.2 \times 10^4$ through separation of reaction product; Further mixing such oligomer with limited sodium bisulfide, sodium hydrate, p-dichlorobenzene and NMP for directly heating and polymerization to obtain PPS product with weight-average molecular weight of approximate $2.5 \times 10^4$ through separation. Nevertheless, the quantity of synthetic low polymer as obtained with this method is extremely low. Patents (CN200310123491.0, CN200580039249.2, CN200780017569.7 and CN200780102158.8) as applied by the company in China have also proposed the method for synthesis of PPS resin through dehydration and addition of p-dichlorobenzene for multi-stage polymerization by taking sodium bisulfide as the material, sodium acetate as the additive and NMP as the solvent.

According to patent (TK 2004-244619) applied by KUREHA TECHNO ENG CO., LTD, sodium bisulfide is mixed with NMP for heating and dehydration prior to polymerization through heating with addition of p-dichlorobenzene. Once the temperature is increased to 180° C., further dropping sodium hydroxide solution to control pH value of the reaction system prior to further heating to the temperature of 230° C.; supplement water (mole ratio of $H_2O/S$ is normally above 2.0) for eventual heating to the temperature of 260° C. until the reaction is completed; Finally, proceeding with treatment to the reaction product to obtain PPS resin. Patent (CN200380107629.6) as applied by the company in China has also proposed to proceed with normal dehydration and multi-stage polymerization with addition of p-dichlorobenzene by taking sodium bisulfide as the material and NMP as the solvent. Once the polymerization is completed, filter the reaction slurry, and use acetone for washing, leaching and pickling of filter cake prior to further washing and drying to obtain granular PPS resin of different viscosities.

Dehydration process in aforesaid synthesis technique using sodium bisulfide is similar to the technique using sodium sulfide. The only difference is the addition of reaction between sodium bisulfide and sodium hydroxide. Furthermore, sodium bisulfide is relatively poor in stability with loss between 1.0-3.5 mol %. It has brought difficulties to synthesis of PPS of higher molecular weight.

In 1991, Darryl R. Fahey and Carlton E. Ash (Darry R. Fahey, Carlton E. Ash. Mechanism of Poly(p-phenylene sulfide) growth from p-Dichlorobenzene and Sodium Sulfide. Macromolecules, 1991, 24, 4242-4249), carried out thorough study on chemical reactions during heating of water contained sodium sulfide and NMP. Substances as contained in the system are normally indicated as $Na_2S \cdot NMP \cdot H_2O$ by the empirical formula after dehydration. However, according to analysis and inference by the research personnel through nuclear magnetic resonance, more correct one is the mixture of sodium4-(N-methylamino)-butanoate (SMAB) and sodium bisulfide, namely SMAB-NaHS mixture. SMAB-NaHS mixture is available for better dissolution in NMP of certain temperature. Nevertheless, anhydrous $Na_2S$ and NaHS are almost insoluble. It is applicable to obtain such mixture through heating of mixed SMAB and NaHS or NaHS, NaOH and NMP. Furthermore, it is also easy to obtain SMAB through reaction by heating mixed NaOH and NMP.

In conclusion, it is normally required to add polymerization additives for synthesis of PPS resin of high molecular weight that is appropriate for spinning. Common polymerization additives as reported in literatures are mainly represented by sodium acetate and lithium chloride. Sodium acetate and lithium chloride might be partially in solid form upon completion of reaction due to their limited solubility in NMP. This part of sodium acetate or lithium chloride is unlikely to be separated from sodium chloride, the reaction by-product; whereas sodium acetate or lithium chloride dissolved in NMP is to be in the form of salt, which is to be converted into raffinate during distilled recycling of NMP. Therefore, sodium acetate and lithium chloride, the two conventional polymerization additives, are unlikely to be recycled.

DESCRIPTION OF THE INVENTION

In view of problems as reported in previous literatures, the present invention aims to provide a fiber polyphenylene sulfide resin synthesis method featuring in simple production techniques and easy recycling of polymerization additives.

A fiber-grade polyphenylene sulfide resin synthesis method taking sodium bisulfide solution (hereinafter referred to as NaHS solution) and p-dichlorobenzene (hereinafter referred to as PDCB) as materials, N-methyl-pyrrolidone (hereinafter referred to as NMP) as solvents and C5-C6 fatty acid salt as polymerization additives for synthesis through polymerization, of which specific procedures are stated as follows:

(1) Adding NMP, 40%-50% NaOH solution and C5-C6 fatty acid into the reactor for heating to the temperature of 90-120° C. at the velocity of 1.0~2.0° C./min and simultaneously with mixing and nitrogen protection; proceeding with heat preservation for 1-3 hours before prior to further heating to the temperature of 180~200° C. at the velocity of 1.0~2.0° C./min for dehydration; reducing the temperature to 110~130° C. after dehydration;

(2) Adding NaHS solution and NMP into the reactor following Step (1) for heating to the temperature of 180~200° C. at the velocity of 0.7~1.5° C./min simultaneously with mixing and nitrogen protection prior to dehydration; further reducing the temperature to 140~160° C. when water content in the system is below 1.0 mol/mol sulfur.

(3) Adding PDCB and NMP into the reactor after Step (2) for heating to the temperature of 220~240° C. within 1.0-1.5 hours prior to heat preservation for 1-3 hours; further proceeding with heating to the temperature of 260~280° C. at the velocity of 1.0~1.5° C./min prior to heat preservation for 1-3 hours; once completed, reducing the temperature to 130~150° C. within 0.5-1 hour to obtain PPS reaction slurry;

(4) Proceeding with centrifugation of PPS reaction slurry as obtained through Step (3) then leaching with 130~150° C. NMP of the same mass as the filter cake; Further proceeding with leaching with hydrochloric acid solution of the same mass as the filter cake prior to mixing and collection of all filtrate;

(5) Repeatedly washing the filter cake as obtained in Step (4) with 70~100° C. deionized water until the chlorine ion is acceptable; further drying the filter cake to obtain polyphenylene sulfide resin;

(6) Agitating and mixing the filtrate as obtained in Step (4) for separation of C5-C6 fatty acid through azeotropic rectification in a rectification device installed with a water segregator; proceeding with further rectification to remove the moisture; finally, proceeding with depressurized distillation for recycling of solvent NMP; distillation residues are to be disposed by means of combustion.

Preferred C5-C6 fatty acids as obtained in the said Step (1) include hexanoic acid, pentanoic acid, isovaleric acid, 2-ethyl butyric acid and their mixture of any proportion.

1.0 mol NaHS is selected as the benchmark for materials as obtained in the Step (1); consumption of fatty acids, NMP and NaOH is up to 0.1~0.5 mol, 2.8~3.2 mol and 1.1~1.5 mol respectively.

1.0 mol NaHS is selected as the benchmark for materials as obtained in the Step (2); total NMP in the system is 3.2~3.6 mol after addition of NaHS and NMP.

1.0 mol NaHS is selected as the benchmark for materials as obtained in the Step (3); consumption of PDCB and total NMP in the system is up to 0.99~1.02 mol and 4.3~4.7 mol respectively after addition of PDCB and NMP.

1.0 mol polymerization additive is selected as the benchmark for leaching with hydrochloric acid in the said Step (4); consumption of hydrochloric acid is 1.2~1.3 mol.

Key point of the present invention lies in the fact that C5-C6 fatty acid salt as formed through dehydration of C5-C6 fatty acid and sodium hydroxide is selected as the polymerization additive. C5-C6 fatty acid salt has a higher solubility in NMP than such inorganic acid salts as lithium chloride and such short-chain fatty acid salts as sodium acetate, which can better promote polymerization. C5-C6 fatty acid salt is to be thoroughly dissolved in NMP upon completion of reaction, which is to be fully diverted into the filtrate after filter prior to conversion into free fatty acid again through acidification with hydrochloric acid. As shown in Table 1, C5-C6 fatty acid used in the present invention is available for azeotropy with water, which has a limited solubility in water. Therefore, it is applicable to recycle C5-C6 fatty acid from the filtrate through azeotropy with water, and thereby solve the problem with separation of additive and sodium chloride that are soluble in water.

TABLE 1

| Compounds | Solubility in water at normal temperature | Azeotrope formed with water | |
|---|---|---|---|
| | | Boiling point/° C. | Composition/% |
| Acetic acid | Miscibility | No azeotropy | |
| Hexanoic acid | 0.97 | 99.8 | 7.9 |
| Pentanoic acid | 2.4 | 99.6 | 12.1 |
| Isovleric acid | 4.1 | 99.5 | 18.4 |
| 2-ethyl butyric acid | 0.22 | 99.7 | 10.2 |

Effect of the present invention: The present invention takes C5-C6 fatty acid salt as formed through dehydration to C5-C6 fatty acid and sodium hydroxide as polymerization additive, sodium bisulfide solution and p-dichlorobenzene as materials and N-Methyl pyrrolidone as the solvent for synthesis of a fiber-grade PPS resin through polymerization. In view of the fact that MFR is below 125 g/10 min, weight-average molecular weight as measured by GPC is over $4.2 \times 10^4$, and whiteness is over 90, it can satisfy requirements for fiber-grade polyphenylene sulfide resin.

As compared with recycling process of prior arts on synthesis of PPS resin, recycling process of the present invention features in simple operation and high recycling rate of additives and solvents, which is favorable for reduction of production cost and minimization of the quantity of "three wastes" handled.

PREFERRED EMBODIMENTS

Further description of techniques of the present invention is provided as follows in combination with embodiments.

Embodiment 1

29.74 Kg (300.0 mol) N-methyl-2-pyrrolidone (hereinafter referred to as NMP), 13.0 Kg (130.0 mol) 40% sodium hydroxide and 3.485 Kg (30.0 mol) hexanoic acid were added into a 100 L reactor for heating to the temperature of 120° C. at the velocity of 2.0° C./min simultaneously with mixing at the velocity of 300 rpm and nitrogen protection. Heat preservation was conducted for 1 hour prior to further heating to the temperature of 200° C. at the velocity of 2.0° C./min. 8.74 Kg aqueous solution (97.88% water content) was eliminated prior to cooling to the temperature of 130° C. 14.02 Kg (100.0 mol) 40% sodium bisulfide and 4.09 Kg (41.3 mol) NMP were added for heating to the temperature of 200° C. at the velocity of 1.5° C./min while maintaining same mixing velocity. 9.71 Kg aqueous solution (86.59% water content) was eliminated prior to cooling to the temperature of 160'C. At this point, sulfur and water content in the system were 99.0 mol and 87.8 mol, respectively.

14.55 Kg (99.0 mol) para-dichlorobenzene (hereinafter referred to as PDCB) and 10.38 Kg (104.8 mol) NMP were added into the aforesaid reactor, and the temperature was increased to 220° C. within 1 hour approximately prior to heat preservation for 3 hours. After that, the temperature was further increased to 260° C. at the velocity of 1.0° C./min prior heat preservation for 3 hours. Once completed, the temperature was reduced to 150° C. within half hour approximately. Centrifugation of materials inside the reactor was conducted, and 23.6 Kg 150° C. NMP was used to leach the filter cake and simultaneously with centrifugation. 23.6 Kg 5.6% hydrochloric acid solution (containing 36.0 mol hydrochloric acid) was used for leaching prior to centrifugation, and 92.7 Kg mixed filtrate was obtained.

50 Kg 100° C. deionized water was used at a time to wash the filter cake for 8 times to check if chlorine ion content in the water is acceptable. The filter cake was further dried after washing to obtain 10.2 Kg white polyphenylene sulfide resin. Melt mass-flow rate (hereinafter referred to as MFR) for product test was 110 g/10 min. Weight-average molecular weight as measured by GPC was $4.65 \times 10^4$; whereas whiteness (L value as indicated by LAB test results) was 92.3.

The aforesaid mixed filtrate was poured into a 150 L rectification device with water separator for separation of 3.42 Kg hexanoic acid through azeotropic rectification at the tower top temperature of 99.0~99.8° C. After that, 20.2 Kg water was eliminated through secondary rectification before recycling 64.8 Kg NMP solvent through depressurized distillation. Distillation residues were disposed through combustion.

Embodiment 2

29.74 Kg (300.0 mol) N-methyl-2-pyrrolidone (hereinafter referred to as NMP), 11.56 Kg (130.0 mol) 45% sodium hydroxide and 3.485 Kg (30.0 mol) 2-ethyl butyric acid were added into a 100 L reactor for heating to the temperature of 90° C. at the velocity of 1.0° C./min simultaneously with mixing at the velocity of 100 rpm and nitrogen protection. Heat preservation was conducted for 3 hours prior to further heating to the temperature of 180° C. at the velocity of 1.0° C./min. 7.12 Kg aqueous solution (97.23% water content) was eliminated prior to cooling to the temperature of 110° C. 14.02 Kg (100.0 mol) 40% sodium bisulfide and 4.09 Kg (41.3 mol) NMP were added for heating to the temperature of 180° C. at the velocity of 0.7° C./min while maintaining same mixing velocity. 9.58 Kg aqueous solution (87.81% water content) was eliminated prior to cooling to the temperature of 140° C. At this point, sulfur and water content in the system were 99.1 mol and 98.8 mol, respectively.

14.63 Kg (99.5 mol) para-dichlorobenzene (hereinafter referred to as PDCB) and 10.28 Kg (103.8 mol) NMP were added into the aforesaid reactor, and the temperature was increased to 240° C. within 1.5 hours approximately prior to heat preservation for 1 hour. After that, the temperature was further increased to 280° C. at the velocity of 1.5° C./min prior heat preservation for 1 hour. Once completed, the temperature was reduced to 130° C. within 1 hour approximately. Centrifugation of materials inside the reactor was conducted, and 24.1 Kg 130° C. NMP was used to leach the filter cake and simultaneously with centrifugation. 24.1 Kg 5.4% hydrochloric acid solution (containing 36.0 mol hydrochloric acid) was used for leaching prior to centrifugation, and 93.3 Kg mixed filtrate was obtained.

50 Kg 70° C. deionized water at a time was used to wash the filter cake subjecting for 9 times to check if chlorine ion content in the water is acceptable. The filter cake was further dried after washing to obtain 10.2 Kg white polyphenylene sulfide resin. Melt mass-flow rate (hereinafter referred to as MFR) for product test was 103 g/10 min. Weight-average molecular weight as measured by GPC was $4.76 \times 10^4$; whereas whiteness (L value as indicated by LAB test results) was 91.1.

Aforesaid mixed filtrate was poured into the 150 L rectification device with water separator for separation of 3.41 Kg ethyl butyric acid through azeotropic rectification at the tower top temperature of 99.0~99.7° C. After that, 21.3 Kg water was eliminated through secondary rectification before recycling 65.8 Kg NMP solvent through depressurized distillation; distillation residues were disposed through combustion.

Embodiment 3

27.76 Kg (280.0 mol) N-methyl-2-pyrrolidone (hereinafter referred to as NMP), 11.0 Kg (110.0 mol) 40% sodium hydroxide and 1.021 Kg (10.0 mol) pentanoic acid were added into 100 L reactor for heating to the temperature of 100° C. at the velocity of 1.5° C./min simultaneously with mixing at the velocity of 200 rpm and nitrogen protection. Heat preservation was conducted for 2 hours prior to further heating to the temperature of 190° C. at the velocity of 1.5° C./min. 7.03 Kg aqueous solution (97.52% water content) was eliminated prior to cooling to the temperature of 110° C. 18.69 Kg (100.0 mol) 30% sodium bisulfide and 5.69 Kg (57.5 mol) NMP were added for heating to the temperature of 190° C. at the velocity of 1.5° C./min while maintaining same mixing velocity. 14.88 Kg aqueous solution (87.95% water content) was eliminated prior to cooling to the temperature of 150° C. At this point, sulfur and water content in the system were 99.0 mol and 96.3 mol, respectively.

148.4 Kg (101.0 mol) para-dichlorobenzene (hereinafter referred to as PDCB) and 10.78 Kg (108.9 mol) NMP were added into the aforesaid reactor, and the temperature was increased to 250° C. within 1.2 hours approximately prior to heat preservation for 2 hours. After that, the temperature was further increased to 270° C. at the velocity of 1.0° C./min prior to heat preservation for 2 hours; once completed, the temperature was reduced to 140° C. within 0.7 hours approximately. Centrifugation of materials inside the reactor was conducted, and 23.9 Kg 130° C. NMP was used to leach the filter cake and simultaneously with centrifugation. 23.9 Kg 2.0% hydrochloric acid solution (containing 13.0 mol hydrochloric acid) was further used for leaching prior to centrifugation, and 92.9 Kg mixed filtrate was obtained.

50 Kg 80° C. deionized water at a time was used to wash the filter cake for 9 times to check if chlorine ion content in the water is acceptable. The filter cake after washing was further dried to obtain 10.3 Kg white polyphenylene sulfide resin; melt mass-flow rate (hereinafter referred to as MFR) for product test was 123 g/10 min; weight-average molecular weight as measured by GPC was $4.21 \times 10^4$; whereas whiteness (value L as indicated by LAB test results) was 93.2.

Aforesaid mixed filtrate was poured into the 150 L rectification device with water separator for separation of 0.98 Kg pentanoic acid through azeotropic rectification at the tower top temperature of 99.0~99.6° C. After that, 21.1 Kg water was eliminated through secondary rectification before recycling 66.7 Kg NMP solvent through depressurized distillation. Distillation residues were disposed through combustion.

Embodiment 4

31.92 Kg (320.0 mol) N-methyl-2-pyrrolidone (hereinafter referred to as NMP), 12.0 Kg (150.0 mol) 50% sodium hydroxide and 5.105 Kg (50.0 mol) isovleric acid were added into 100 L reactor for heating to the temperature of 100° C. at the velocity of 1.5° C./min simultaneously with mixing at the velocity of 200 rpm and nitrogen protection. Heat preservation was conducted for 2 hours prior to further heating to the temperature of 190° C. at the velocity of 1.5° C./min. 7.20 Kg aqueous solution (97.82% water content) was eliminated prior to cooling to the temperature of 110° C. 11.22 Kg (100.0 mol) 50% sodium bisulfide and 3.17 Kg (32.0 mol) NMP were added for heating to the temperature of 190° C. at the velocity of 1.5° C./min while maintaining same mixing velocity. 6.24 Kg aqueous solution (89.87% water content) was eliminated prior to cooling to the temperature of 150° C. At this point, sulfur and water content in the system were 99.2 mol and 92.2 mol, respectively.

147.0 Kg (100.0 mol) para-dichlorobenzene (hereinafter referred to as PDCB) and 10.89 Kg (110.0 mol) NMP were added into the aforesaid reactor, and the temperature was increased to 250° C. within 1.2 hours approximately prior to heat preservation for 2 hours. After that, the temperature was further increased to 270° C. at the velocity of 1.0° C./min prior to heat preservation for 2 hours. Once completed, the temperature was reduced to 140° C. within 0.7 hours approximately. Centrifugation of materials inside the reactor was conducted, and 23.1 Kg 130° C. NMP was used to leach the filter cake and simultaneously with centrifugation. 23.1 Kg 9.5% hydrochloric acid solution (containing 60.0 mol hydrochloric acid) was used for leaching prior to centrifugation, and 100.2 Kg mixed filtrate was used.

50 Kg 80° C. deionized water at a time was used to wash the filter cake for 10 times to check whether chlorine ion content in the water is acceptable. The filter cake was further dried after washing to obtain 10.1 Kg white polyphenylene sulfide resin. Melt mass-flow rate (hereinafter referred to as MFR) for product test was 98 g/10 min; weight-average molecular weight as measured by GPC was $4.85 \times 10^4$; whereas whiteness (L value as indicated by LAB test results) was 90.1.

The aforesaid mixed filtrate was poured into the 150 L rectification device with a water separator for separation of 4.95 Kg pentanoic acid through azeotropic rectification at the tower top temperature of 99.0~99.5° C. After that, 19.2 Kg water was eliminated through secondary rectification before recycling 71.7 Kg NMP solvent through depressurized distillation. Distillation residues were disposed through combustion.

Embodiment 5

Other operations were identical to Embodiment 1 except for replacement of hexanoic acid in Embodiment 1 with 3.485 Kg recycled one.

10.2 Kg white polyphenylene sulfide resin was obtained eventually. According to product test, melt mass-flow rate (hereinafter referred to as MFR) was 108 g/10 min; weight-average molecular weight as measured by GPC was $4.69 \times 10^4$; whiteness (value L as indicated by LAB test results) was 92.2.

Embodiment 6

Other operations were identical to Embodiment 2 except for replacement of 2-ethyl butyric acid in Embodiment 2 with 3.485 Kg recycled one.

10.2 Kg white polyphenylene sulfide resin was obtained. According to product test, melt mass-flow rate (hereinafter referred to as MFR) was 105 g/10 min; weight-average molecular weight as measured by GPC was $4.73 \times 10^4$; whiteness (value L as indicated by LAB test results) was 91.3.

Embodiment 7

Other operations were identical to Embodiment 3 except for replacement of pentanoic acid in Embodiment 3 with 1.021 Kg recycled one.

10.3 Kg white polyphenylene sulfide resin was obtained eventually. According to product test, melt mass-flow rate (hereinafter referred to as MFR) was 121 g/10 min; weight-average molecular weight as measured by GPC was $4.27 \times 10^4$; whiteness (value L as indicated by LAB test results) was 92.7.

Embodiment 8

Other operations were identical to Embodiment 4 except for replacement of isovleric acid in Embodiment 4 with 5.105 Kg recycled one.

10.1 Kg white polyphenylene sulfide resin was obtained eventually. According to product test, melt mass-flow rate (hereinafter referred to as MFR) was 96 g/10 min; weight-average molecular weight as measured by GPC was $4.96 \times 10^4$; whiteness (value L as indicated by LAB test results) was 90.3.

Embodiment 9

29.74 Kg (300.0 mol) N-methyl-2-pyrrolidone (hereinafter referred to as NMP), 13.0 Kg (130.0 mol) 40% sodium hydroxide and 2.323 Kg (20.0 mol) hexanoic acid and 1.162 Kg (10.0 mol) 2-ethyl butyric acid were added into 100 L reactor for heating to the temperature of 120° C. at the velocity of 2.0° C./min simultaneously with mixing at the velocity of 300 rpm and nitrogen protection. Heat preservation was conducted for 1 hour prior to further heating to the temperature of 200° C. at the velocity of 2.0° C./min. 8.59 Kg aqueous solution (97.38% water content) was eliminated prior to cooling to the temperature of 130° C. 14.02 Kg (100.0 mol) 40% sodium bisulfide and 4.11 Kg (41.5 mol) NMP were added for heating to the temperature of 200° C. at the velocity of 1.5° C./min while maintaining same mixing velocity. 9.74 Kg aqueous solution (86.33% water content) was eliminated prior to cooling to the temperature of 160° C. At this point, sulfur and water content in the system were 99.0 mol and 88.7 mol, respectively.

14.55 Kg (99.0 mol) para-dichlorobenzene (hereinafter referred to as PDCB) and 10.40 Kg (105.1 mol) NMP were added into the aforesaid reactor, and the temperature was increased to 220° C. within 1 hour approximately prior to heat preservation for 3 hours. After that, the temperature was further increased to 260° C. at the velocity of 1.0° C./min prior to heat preservation for 3 hours. Once completed, the temperature was reduced to 150° C. within half an hour approximately. Centrifugation of materials inside the reactor was conducted, and 23.5 Kg 150° C. NMP was used to leach the filter cake and simultaneously with centrifugation. 23.65 Kg 5.6% hydrochloric acid solution (containing 36.0 mol hydrochloric acid) was used for leaching prior to centrifugation, and 92.5 Kg mixed filtrate was obtained.

50 Kg 100° C. deionized water at a time was used to wash the filter cake for 8 times to check whether chlorine ion content in the water is acceptable. The filter cake was further dried after washing to obtain 10.2 Kg white polyphenylene sulfide resin. Melt mass-flow rate (hereinafter referred to as MFR) for product test was 109 g/10 min; weight-average molecular weight as measured by GPC was $4.69 \times 10^4$; whereas whiteness (L value as indicated by LAB test results) was 92.2.

The aforesaid mixed filtrate was poured into the 150 L rectification device with water separator for separation of 2.13 Kg hexanoic acid and 1.12 Kg ethyl butyric acid through azeotropic rectification at the tower top temperature of 99.0~99.8° C. After that, 20.3 Kg water was eliminated through secondary rectification before recycling 64.6 Kg NMP solvent through depressurized distillation. Distillation residues were disposed through combustion.

Embodiment 10

31.92 Kg (320.0 mol) N-methyl-2-pyrrolidone (hereinafter referred to as NMP), 12.0 Kg (150.0 mol) 50% sodium hydroxide and 2.553 Kg (25.0 mol) isovleric acid and 2.553 Kg (25.0 mol) pentanoic acid were added into 100 L reactor for heating to the temperature of 100° C. at the velocity of 1.5° C./min simultaneously with mixing at the velocity of 200 rpm and nitrogen protection. Heat preservation was conducted for 2 hours prior to further heating to the temperature of 190° C. at the velocity of 1.5° C./min. 7.23 Kg aqueous solution (97.28% water content) was eliminated prior to cooling to the temperature of 110° C. 11.22 Kg (100.0 mol) 50% sodium bisulfide and 3.18 Kg (32.1 mol) NMP were added for heating to the temperature of 190° C. at the velocity of 1.5° C./min while maintaining same mixing velocity. 6.30 Kg aqueous solution (88.98% water content) was eliminated prior to cooling to the temperature of 150° C. At this point, sulfur and water content in the system were 99.2 mol and 92.6 mol, respectively.

147.0 Kg (100.0 mol) para-dichlorobenzene (hereinafter referred to as PDCB) and 11.39 Kg (115.1 mol) NMP were added into the aforesaid reactor, and increase the temperature to 250° C. within 1.2 hours approximately prior to heat preservation for 2 hours. After that, the temperature was further increased to 270° C. at the velocity of 1.0° C./min prior to heat preservation for 2 hours. Once completed, the temperature was reduced to 140° C. within 0.7 hours approximately. Centrifugation of materials inside the reactor was conducted, and 23.2 Kg 130° C. NMP was used to leach the filter cake and simultaneously with centrifugation. 23.2 Kg 9.45% hydrochloric acid solution (containing 60.0 mol hydrochloric acid) was further used for leaching prior to centrifugation, and 101.1 Kg mixed filtrate was obtained.

50 Kg 80° C. deionized water at a time was used to wash the filter cake for 10 times to check whether chlorine ion content in the water is acceptable. The filter cake was further baked after washing to obtain 10.1 Kg white polyphenylene sulfide resin. Melt mass-flow rate (hereinafter referred to as MFR) for product test was 97 g/10 min; weight-average molecular weight as measured by GPC was $4.88 \times 10^4$; whereas whiteness (L value as indicated by LAB test results) was 90.3.

The aforesaid mixed filtrate was poured into the 150 L rectification device with water separator for separation of 2.46 Kg (25.0 mol) isovleric acid and 2.48 Kg pentanoic acid through azeotropic rectification at the tower top temperature of 99.0~99.5° C. After that, 19.4 Kg water was eliminated through secondary rectification before recycling 71.5 Kg NMP solvent through depressurized distillation; distillation residues were disposed through combustion.

The invention claimed is:

1. A fiber-grade polyphenylene sulfide resin synthesis method, characterized in that the method uses sodium bisulfide and p-dichlorobenzene as raw materials, N-methyl pyrrolidone as a solvent and C5-C6 fatty acid salt as a polymerization additive for synthesis through polymerization, characterized further in that the C5-C6 fatty acid salt is C5-C6 fatty acid sodium salt, and characterized further in the following reaction steps:
   (1) adding NMP, 40%-50% NaOH solution and C5-C6 fatty acid into the reactor for heating to the temperature of 90-120° C. simultaneously with mixing and nitrogen protection at the velocity of 1.0~2.0° C./min; proceeding with heat preservation for 1-3 hours before prior to further heating to temperature of 180~200° C. at the velocity of 1.0~2.0° C./min for dehydration; reducing temperature to 110~130° C. after dehydration;
   (2) adding NaHS solution and NMP into the reactor following Step (1) for heating to temperature of 180~200° C. at the velocity of 0.7~1.5° C./min simultaneously with mixing and nitrogen protection prior to dehydration; further reducing temperature to 140~160° C. when water content in the system is below 1.0 mol/mol sulfur;
   (3) adding PDCB and NMP into the reactor following Step (2) for heating to the temperature of 220~240° C. within 1.0-1.5 hours prior to heat preservation for 1-3 hours; further proceeding with heating to temperature of 260~280° C. at the velocity of 1.0~1.5° C./min prior to heat preservation for 1-3 hours; once completed, reducing temperature to 130~150° C. within 0.5-1 hour to obtain PPS reaction slurry;
   (4) proceeding with centrifugation of PPS reaction slurry as obtained through Step (3), then leaching with 130~150° C. NMP of the same mass as the filter cake; further proceeding with leaching with hydrochloric acid solution of the same mass as the filter cake prior to mixing and collection of all filtrate;
   (5) repeatedly washing the filter cake as obtained in Step (4) with 70~100° C. deionized water; further drying the filter cake to obtain polyphenylene sulfide resin.

2. The fiber-grade polyphenylene sulfide resin synthesis method according to claim 1, characterized in that 1.0 mol NaHS is selected as the benchmark for materials used in reaction step (1); total consumption of C5-C6 fatty acid, NMP and NaOH is up to 0.1~0.5 mol, 2.8~3.2 mol and 1.1~1.5 mol respectively.

3. The fiber-grade polyphenylene sulfide resin synthesis method according to claim 1, characterized in that 1.0 mol NaHS is selected as the benchmark for materials used in reaction step (2); total NMP in the system is 3.2~3.6 mol after addition of NaHS and NMP.

4. The fiber-grade polyphenylene sulfide resin synthesis method according to claim 1, characterized in that 1.0 mol NaHS is selected as the benchmark for materials used in reaction step (3); consumption of PDCB and total NMP in the system is up to 0.99~1.02 mol and 4.3~4.7 mol respectively after addition of PDCB and NMP.

5. The fiber-grade polyphenylene sulfide resin synthesis method according to claim 1, characterized in that 1.0 mol polymerization additive is selected as the benchmark for leaching with hydrochloric acid in the said Step (4); consumption of hydrochloric acid is 1.2~1.3 mol.

6. The fiber-grade polyphenylene sulfide resin synthesis method according to claim 1, characterized in that the filtrate as obtained in Step (4) is to be agitated and mixed for separation of C5-C6 fatty acid through azeotropic rectification in the rectification device with water separator; proceed with further rectification to remove the moisture; finally, proceeding with depressurized distillation for recycling of solvent NMP.

7. The fiber-grade polyphenylene sulfide resin synthesis method according to claim 1, characterized in that the C5-C6 fatty acid salt is generated through reaction among hexanoic acid, pentanoic acid, isovleric acid, 2-ethyl butyric acid and their mixture of random proportion as well as alkali.

* * * * *